US011920550B2

(12) United States Patent
Gudesen et al.

(10) Patent No.: US 11,920,550 B2
(45) Date of Patent: Mar. 5, 2024

(54) SOLUTION MINED CAVITY SYSTEM

(71) Applicant: Hans Gude Gudesen, Gamle Fredrikstad (NO)

(72) Inventors: Hans Gude Gudesen, Gamle Fredrikstad (NO); Per-Erik Nordal, Asker (NO)

(73) Assignee: Hans Gude Gudesen, Gamle Fredrikstad (NO)

( * ) Notice: Subject to any disclaimer, the term of this patent is extended or adjusted under 35 U.S.C. 154(b) by 0 days.

(21) Appl. No.: 17/770,618

(22) PCT Filed: Nov. 9, 2020

(86) PCT No.: PCT/NO2020/050274
§ 371 (c)(1),
(2) Date: Apr. 20, 2022

(87) PCT Pub. No.: WO2021/096365
PCT Pub. Date: May 20, 2021

(65) Prior Publication Data
US 2022/0356862 A1 Nov. 10, 2022

(30) Foreign Application Priority Data
Nov. 15, 2019 (NO) .................................. 20191362

(51) Int. Cl.
*F03B 13/06* (2006.01)
*F03G 7/04* (2006.01)
(52) U.S. Cl.
CPC ................ *F03B 13/06* (2013.01); *F03G 7/04* (2013.01); *F05B 2210/401* (2013.01); *F05B 2260/422* (2020.08)

(58) Field of Classification Search
CPC .......... F03B 13/00; F03B 13/06; F03B 17/00; F03B 17/005; F03B 17/02; F03B 17/04;
(Continued)

(56) References Cited

U.S. PATENT DOCUMENTS 4,182,128 A 1/1980 Gardner
2004/0194929 A1* 10/2004 Ippoushi ................ F24T 10/10
165/104.24
(Continued)

FOREIGN PATENT DOCUMENTS

DE 4127161 A1 * 10/1992
DE 19625113 A1 * 12/1997 ............... F24J 3/084
(Continued)

OTHER PUBLICATIONS

W. Leith, "Geologic and Engineering Constraints on the Feasibility of Clandestine Nuclear testing by Decoupling in Large Underground Cavities", U.S. Geological Survey, Open File Report, Jan. 1, 2001.
(Continued)

*Primary Examiner* — Mark A Laurenzi
*Assistant Examiner* — Xiaoting Hu
(74) *Attorney, Agent, or Firm* — Hershkovitz & Associates, PLLC; Abe Hershkovitz

(57) ABSTRACT

A solution mined cavity system and method are disclosed. The system comprises an underground cavity created by solution mining in salt deposits, an upper water reservoir, tubing structure adapted to lead water from the upper water reservoir into the underground cavity and out of the underground cavity, and a pumping device adapted to contribute to pumping water from the upper water reservoir via the tubing structure out of the cavity.

8 Claims, 6 Drawing Sheets

Figure 1A:
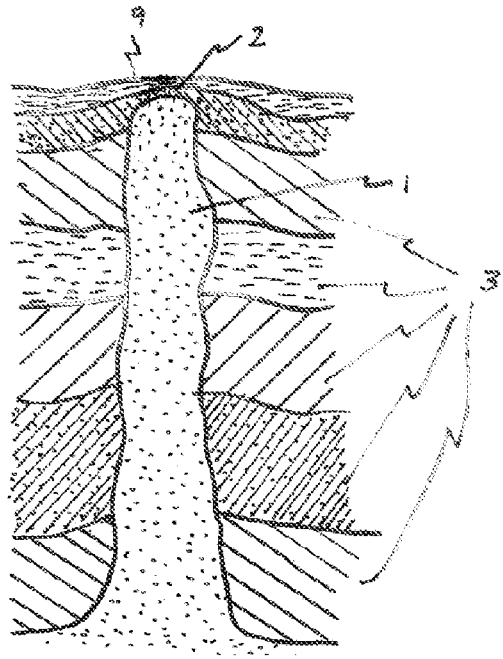

(58) Field of Classification Search
CPC ........ F03G 7/04; F03G 4/00–074; E02B 9/00; F24T 10/10; F24T 10/13; F24T 10/15; F24T 10/17; F24T 10/40; F05B 2260/422
See application file for complete search history.

(56) References Cited

U.S. PATENT DOCUMENTS

| | | | |
|---|---|---|---|
| 2006/0032374 A1* | 2/2006 | Vrana | F04F 10/00 261/36.1 |
| 2009/0085353 A1* | 4/2009 | Riley | F03B 13/06 290/43 |
| 2017/0204738 A1 | 7/2017 | Barakat | |
| 2019/0055930 A1* | 2/2019 | Muir | F03G 7/04 |
| 2020/0325879 A1 | 10/2020 | Gudesen | |

FOREIGN PATENT DOCUMENTS

| | | | | |
|---|---|---|---|---|
| DE | 102006003982 A1 * | 8/2007 | ............... | E02B 9/00 |
| DE | 102006003982 A1 | 8/2007 | | |
| DE | 102008020987 A1 | 11/2009 | | |
| DE | 102011107835 A1 | 1/2013 | | |
| EP | 2538072 A1 * | 12/2012 | ............... | F03B 13/06 |
| GB | 2482557 A | 2/2012 | | |
| NO | 343606 B1 | 4/2019 | | |
| WO | WO 2019074372 A1 | 4/2019 | | |

OTHER PUBLICATIONS

"Physical Properties Data for Rock Salt", National Bureau of Standards Monograph, vol. 167, Jan. 1, 1981.
Wikipedia, "Compressed-Air Energy Storage" (Mar. 19, 2022): https://en.wikipedia.org/wiki/Compressed-air_energy_storage.
Britannica, "Solution Mining" (Mar. 29, 2022): https://www.britannica.com/technology/mining/Solution-mining.
C. H. Jacoby et al., "Salt domes as a source of geothermal energy", Society of Mining Engineers, May 1974, pp. 34-39.
English language Abstract of DE 102006003982 A1 (Aug. 2, 2007).
English language Abstract of DE 102011107835 A1 (Nov. 5, 2009).
English language Abstract of DE 102008020987 A1 (Jan. 17, 2013).
International Search Report in International Application No. PCT/NO2020/050274, dated Jan. 14, 2021.
Norwegian Search Report in related Norwegian Patent Application No. 20191362, dated Jun. 11, 2020.
Written Opinion of the International Searching Authority in International Application No. PCT/NO2020/050274, dated Jan. 14, 2021.

* cited by examiner

SOLUTION MINED CAVITY SYSTEM

FIELD OF THE INVENTION

The present invention generally relates to underground hydroelectric energy generation and storage. More specifically, it relates to an underground hydroelectric energy production and storage system, where the system comprises an underground cavity created by solution mining in salt deposits.

BACKGROUND OF THE INVENTION

The principle of pumped hydroelectric storage (PHS) of energy is well known: Energy is produced by passing water from an upper reservoir to a lower one through a turbine, and energy is stored by pumping water from the lower reservoir to the higher one. In many locations, this simple scheme is not feasible due to the lack of an elevated reservoir, e.g. in flat land regions. In such cases, proposals have been made for a similar scheme, termed underground pumped hydroelectric storage (UPHS), where the upper reservoir is at or near ground level and the lower reservoir is a cavity underground. In order to be able to store a significant amount of energy, this scheme requires a cavity of large volume positioned at a considerable depth. Until now, this has proved to be difficult to achieve in a cost effective manner. The present invention teaches how this problem can be solved, even on very large scales.

In many parts of the world there are underground deposits of salt with volumes that may exceed many cubic kilometers. The deposits are of different types and can be located at a wide range of depths ranging from just below the surface to several kilometers. Their shape and location reflect their geological history and include horizontal layers (bedded deposits), deep columns (salt domes) and salt pillows. Salt deposits have played an important economic role throughout history, being exploited for the salt itself (NaCl, KCl, $NaHCO_3$). During the last decades, however, much interest has centered on the possibility of removing salt by solution mining to create very large underground cavities suitable for a range of specialized storage and containment purposes. An example of the latter is discussed in "Geologic and Engineering Constraints on the Feasibility of Clandestine Nuclear testing by Decoupling in Large Underground Cavities" U.S. Geological Survey, Open File Report 01-28 Jan. 2001, by W. Leith. Storage volumes excavated or leached from salt deposits are particularly attractive due to the possibilities for good sealing and long term stability, properties which have been exploited for storage of hydrocarbons (gas and liquid) and nuclear waste (cf.: "Physical Properties Data for Rock Salt" National Bureau of Standards Monograph 167, January 1981,CODEN: NBSMA6). More recently, the large volumes, pressure resistance and good gas sealing that may be achieved have received interest in connection with Compressed Air Energy Storage (CAES), where energy is stored by filling large underground caverns with compressed air, and energy is recovered by releasing the compressed air through turbines (cf., e.g.: https://en.wikipedia.org/wiki/Compressed-air_energy_storage). Solution mining or in-situ leaching is well known and can yield high extraction rates at low cost (cf., e.g.: https://www.britannica.com/technology/mining/Solution-mining), providing cavity volumes of hundreds of thousands up to several million cubic meters, cf.: "Geologic and Engineering Constraints on the Feasibility of Clandestine Nuclear testing by Decoupling in Large Underground Cavities" U.S. Geological Survey, Open File Report 01-28 Jan. 2001, by W. Leith Underground caverns created by solution mining in salt deposits may enable a paradigm shift in underground pumped hydroelectric storage (UPHS), opening up cost effective avenues towards energy storage on very large scales (GWh to TWh). Surprisingly, this opportunity appears to have been ignored until now. This is all the more surprising since the abovementioned applications for storage of hazardous materials and liquid or gaseous hydrocarbons, as well as applications in Compressed Air Energy Storage (CAES) have been implemented on large scales over several decades, under conditions which are much more stringent than those that would apply for (UPHS).

Means for Solving the Problems

The objective is achieved according to the invention by a system and a method according to independent claims.

A number of non-exhaustive embodiments, variant or alternatives of the invention are defined by the dependent claims.

SUMMARY OF THE INVENTION

A first aspect of the invention is an underground hydroelectric energy production and storage system, where the system comprises:
  an underground cavity created by solution mining in salt deposits;
  an upper water reservoir with an upper water reservoir surface;
  tubing means adapted to lead water from the upper water reservoir into the underground cavity and out of the underground cavity;
  pumping means adapted to contribute to pumping water from the upper water reservoir via the tubing means out of the cavity; and
  energy generating means adapted to generate energy based on water flowing through the tubing means.

Optionally, the underground cavity is consolidated to avoid further dissolution of salt, comprising one or more of the following steps:
  removing salt in at least a part of the cavity;
  impregnating at least a part of the cavity; and
  arranging an impermeable material e.g. membrane in the cavity.

Optionally, the tubing means is an open loop comprising an inlet tube arranged for leading water into an open volume at the bottom of the cavity, and an outlet tube arranged for leading water from the open volume and out of the cavity.

Optionally, the energy generating means comprises a turbine/generator combination arranged above the open volume and to be driven by water flow in the inlet tube, and the pumping means comprises a pump arranged in the open water volume adapted to pump water out of the cavity via the outlet tube.

Optionally, the energy generating means comprises a turbine/generator/pump combination arranged in the open volume and to be driven by water flow in the inlet tube, and adapted to pump water out of the cavity via the outlet tube.

Optionally, the underground cavity is not consolidated, and the pumping means is arranged in an upper part of the open water volume less rich in dissolved salt than a lower part.

Optionally, the tubing means comprises a closed hydraulic loop, the closed hydraulic loop comprising a communicating system adapted to preserve hydraulic head provided by the upper reservoir. Further optionally, the closed hydraulic loop comprises a U tube with a first branch corresponding to the inlet tube, and a second branch corresponding to the outlet tube, and a bottom part connecting the two branches. Further optionally, the cavity is established with at least a lower part at a depth allowing heat transfer from the environment/surroundings of the cavity to a thermal carrier fluid in the cavity.

Optionally, the closed hydraulic loop is arranged to allow for thermally driven density differential pumping, and the pumping means comprises a heat exchanger, and where the closed hydraulic loop is arranged for receiving water from the upper water reservoir and leading the water via an inlet tube through the heat exchanger submerged in the thermal carrier fluid in the cavity, where the thermal carrier fluid in the cavity is representing a thermal reservoir contributing to convection transport of heat from the surroundings, and contributing to pumping the water out via the outlet tube. Further optionally, the energy generating means comprises a turbine arranged and adapted to be driven by water flow in the outlet tube.

Optionally, closed hydraulic loop is arranged to allow for dissolved gas density differential pumping, the system comprising gas provision means arranged to saturate water in the inlet tube with a gas, and the energy generating means comprising a turbine arranged at the bottom part of the closed hydraulic loop. Further optionally, the system comprises gas nucleation means comprising a structure arranged in the outlet tube to assist in nucleating bubbles of the gas out of the water.

Another aspect of the invention is a method for generating and producing energy by operating an underground hydroelectric energy production and storage system as described above.

DESCRIPTION OF THE DIAGRAMS

The above and further features of the invention are set forth with particularity in the appended claims and together with advantages thereof will become clearer from consideration of the following detailed description of an [exemplary] embodiment of the invention given with reference to the accompanying drawings.

Embodiments of the present invention will now be described, by way of example only, with reference to the following diagrams wherein:

FIG. 1a shows a subsurface geological salt dome structure

Figure 1B:
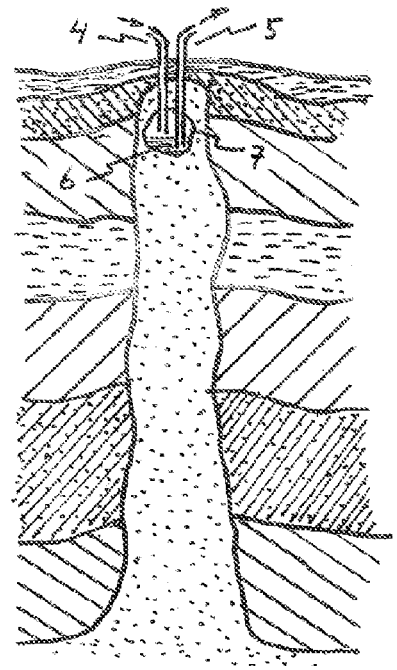
Figure 1C:
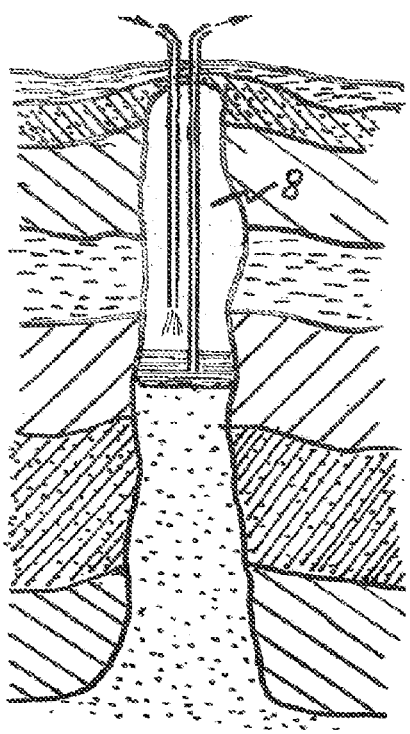
Figure 1D:
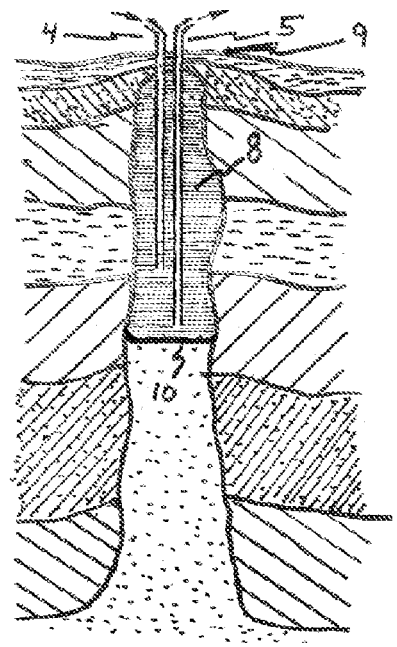
Figure 2A:
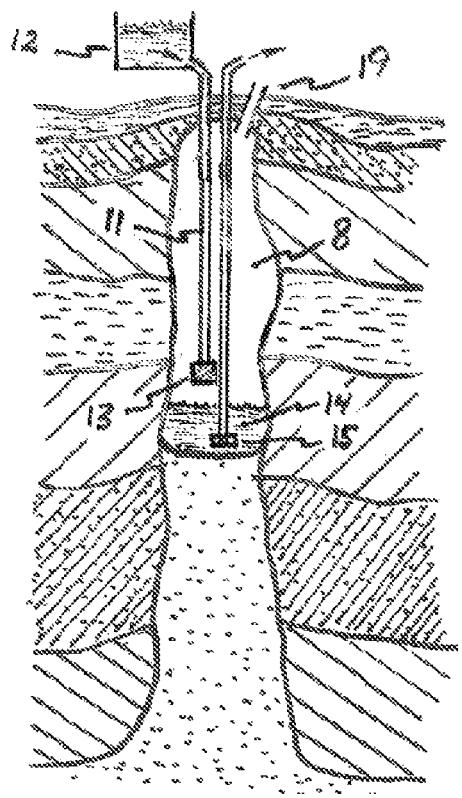
Figure 2B:
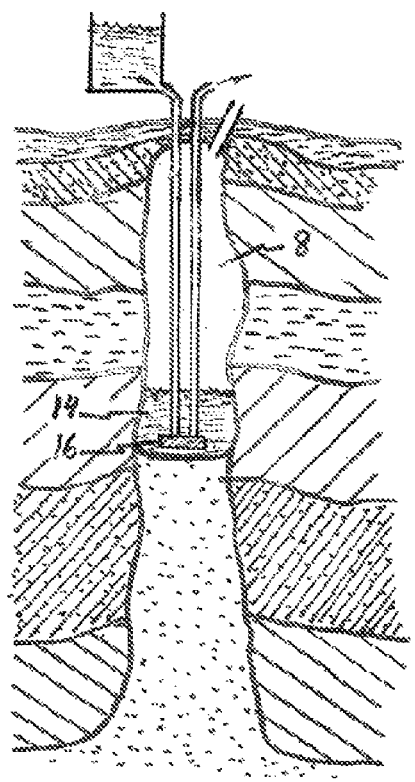
Figure 2C:
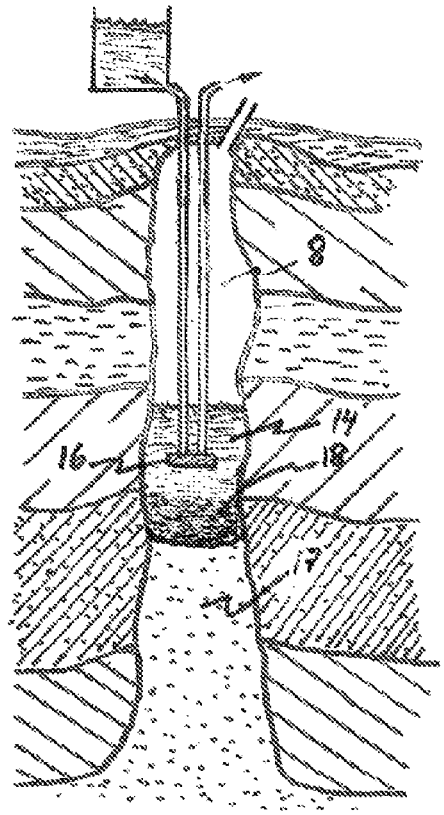
Figure 3:
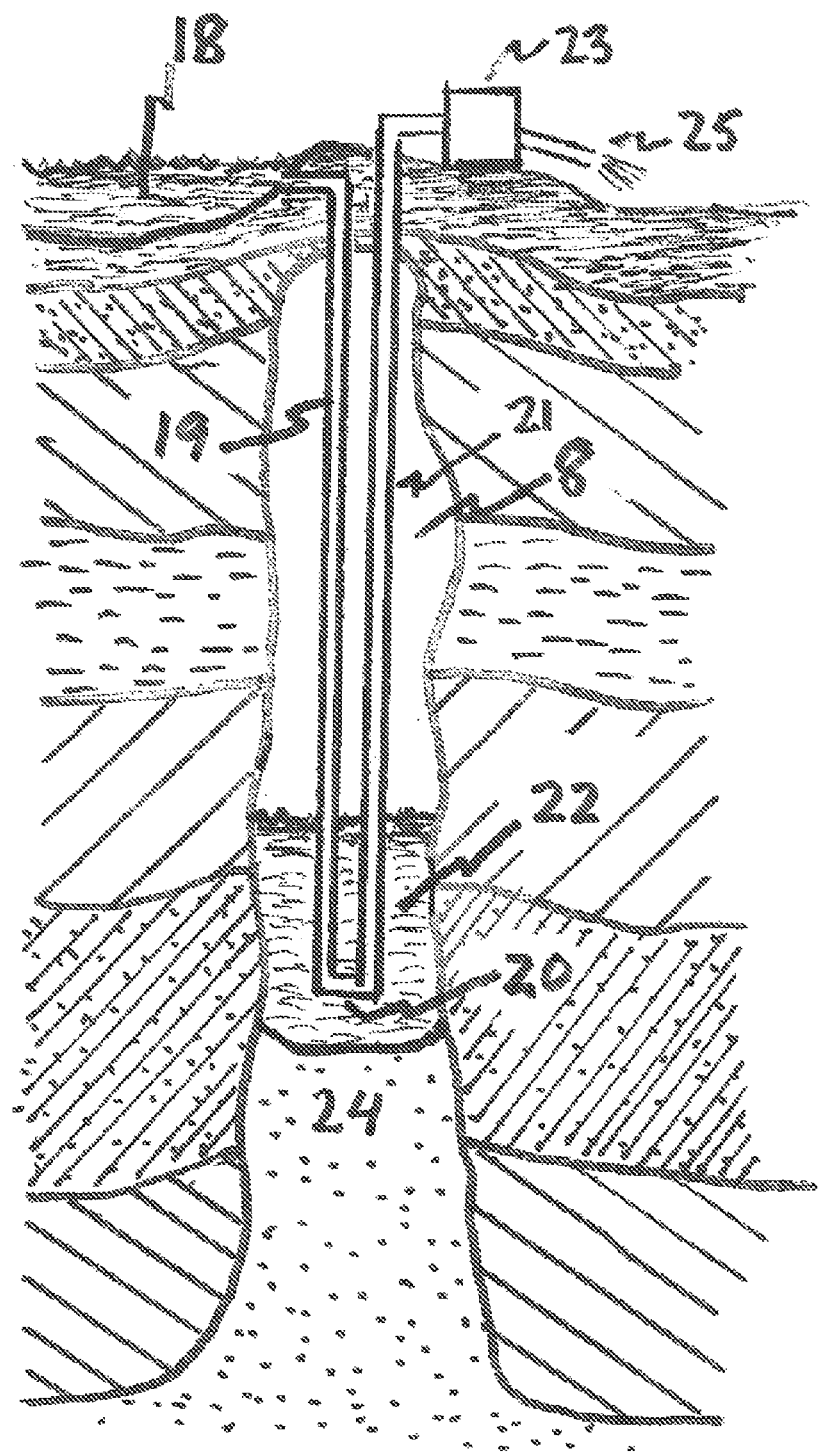
Figure 4A:
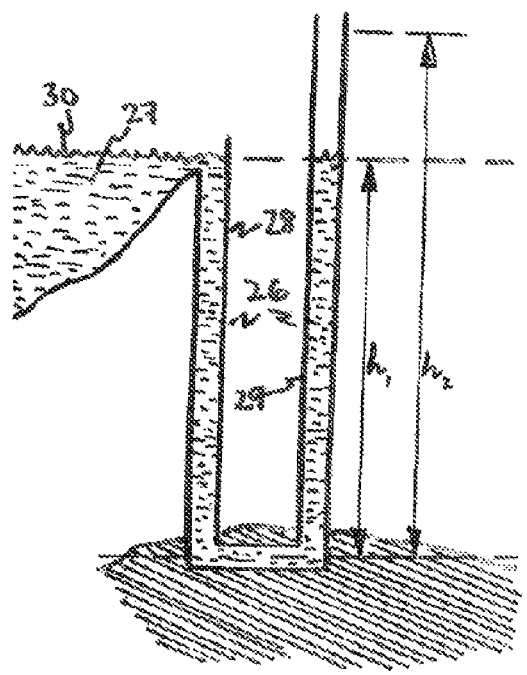
Figure 4B:
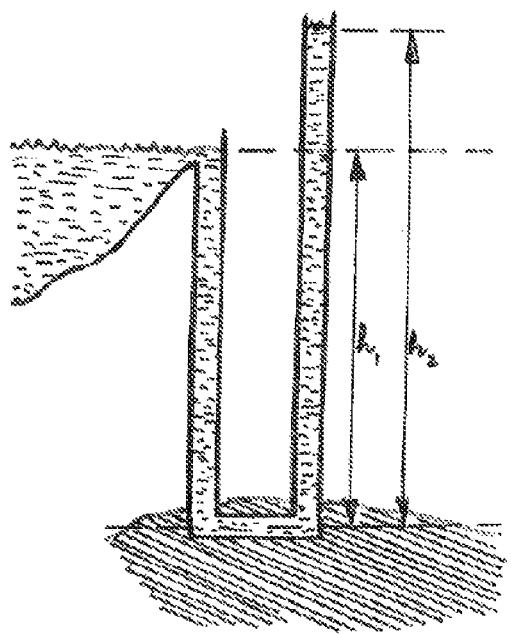
Figure 4C:
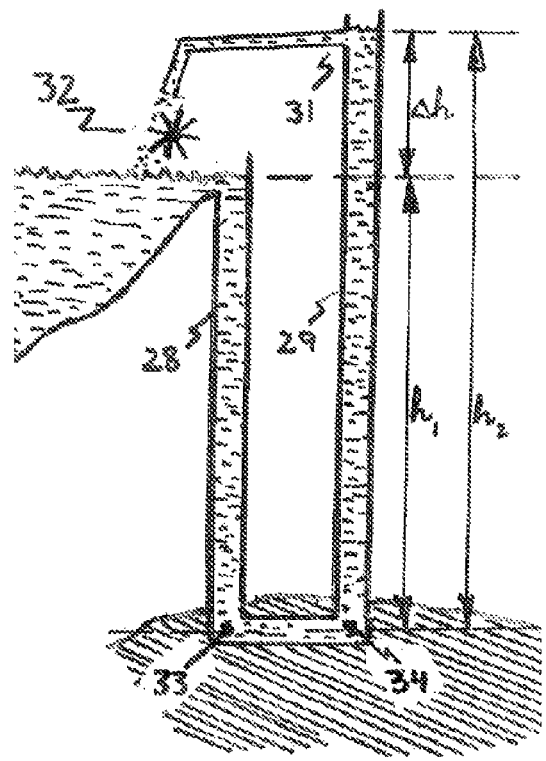
Figure 5:
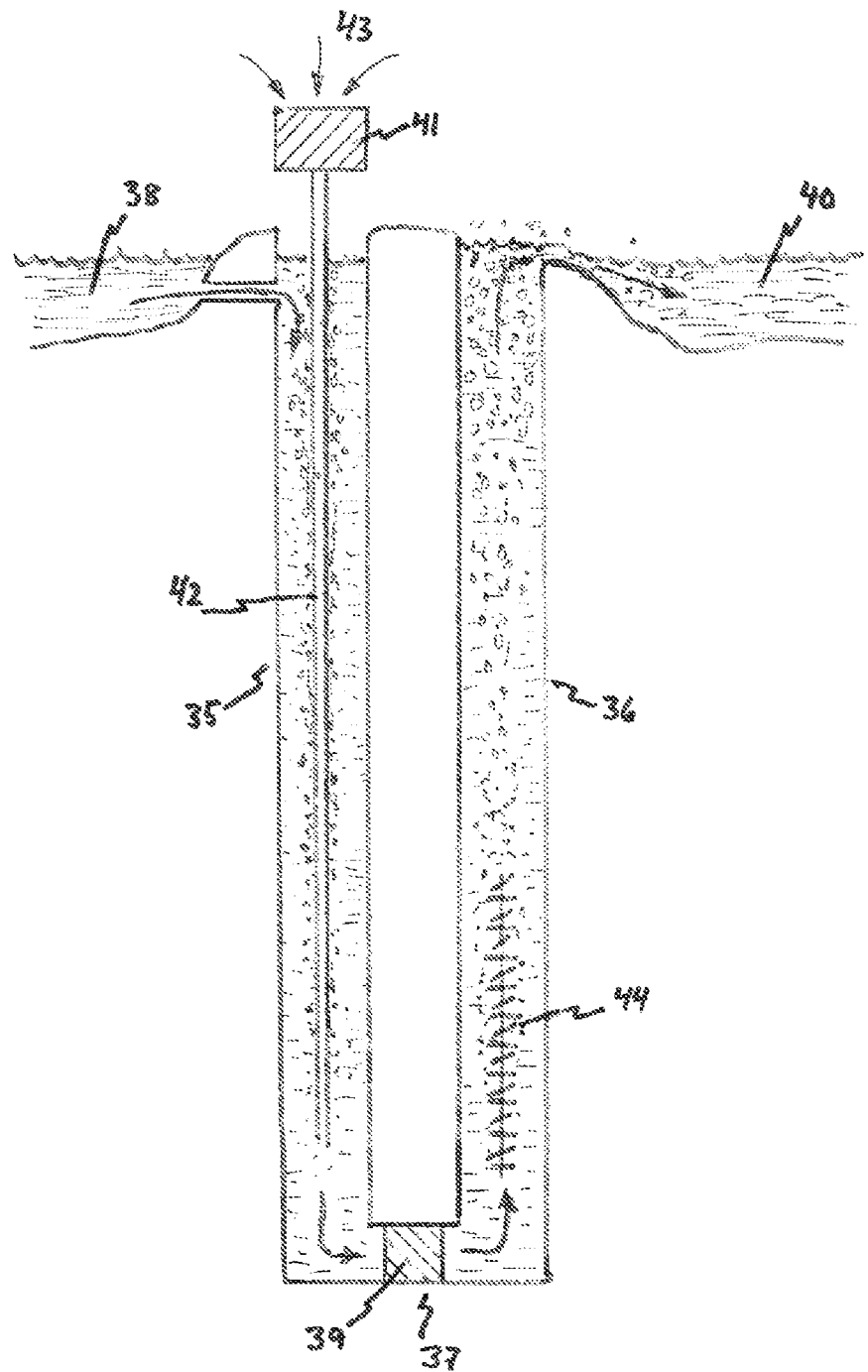
Figure 6:
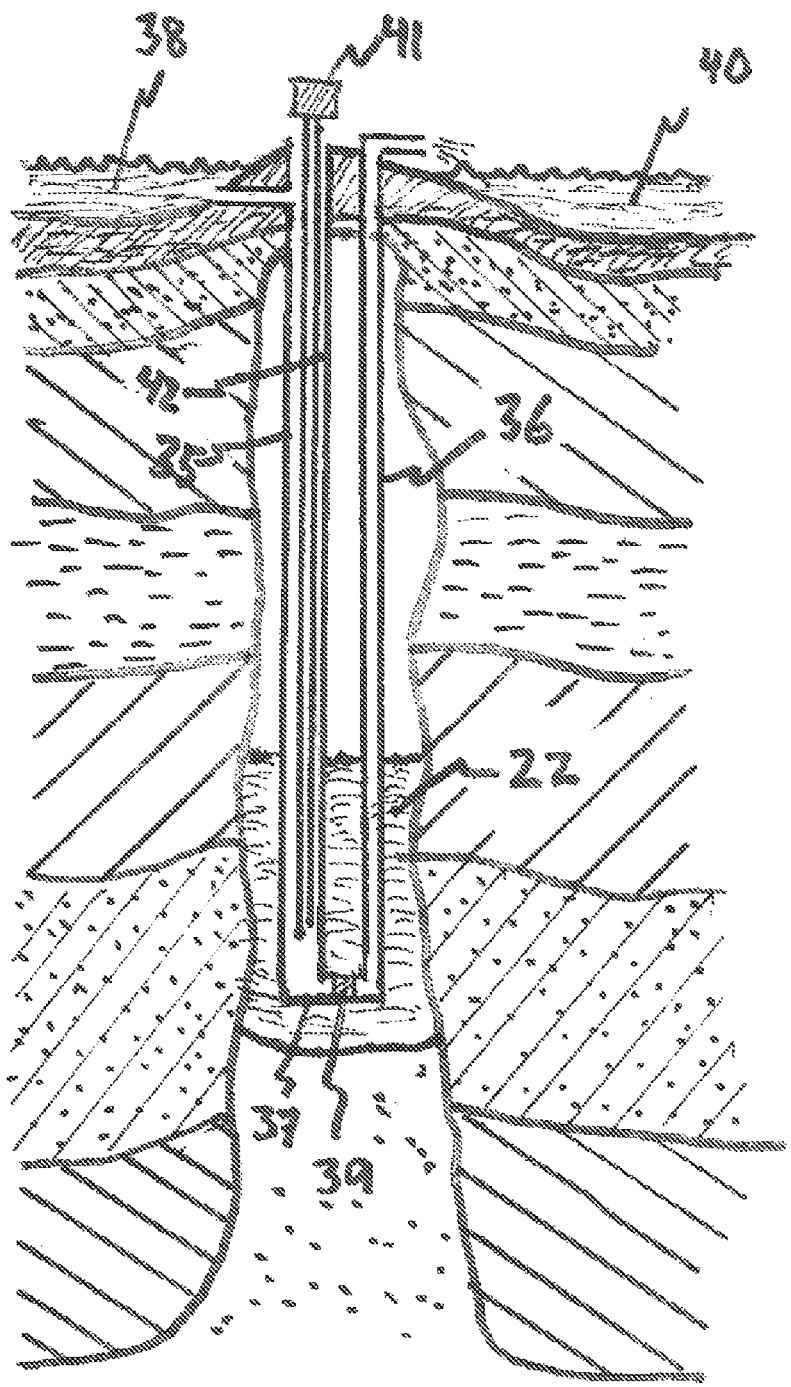

FIG. 1b shows a subsurface geological salt dome structure with an inlet tube providing for a dissolution process and an evacuation tube FIG. 1c shows a subsurface geological salt dome structure where salt has been removed leaving a cavern FIG. 1d shows a closed hydraulic system FIG. 2a-c shows three configurations comprising turbine/generator/pump equipment FIG. 3 shows a thermally driven density differential pumping embodiment FIG. 4a-c illustrate thermally driven extraction of mechanical energy FIG. 5 illustrates the basic principle underlying dissolved gas density differential pumping FIG. 6 illustrates a system based on the principle illustrated in FIG. 5

LIST OF REFERENCE NUMBERS IN THE FIGURES

The following reference numbers and signs refer to the drawings:

| Number | Designation |
|---|---|
| 1 | Salt dome |
| 2 | Layer of cap rock |
| 3 | Surrounding rock strata |
| 4 | Inlet tube |
| 5 | Evacuation tube |
| 6 | Brine |
| 7 | Incipient cavity |
| 8 | Cavern |
| 9 | Surface |
| 10 | Membrane |
| 11 | Penstock |
| 12 | Reservoir |
| 13 | Turbine/generator combination |
| 14 | Volume |
| 15 | Pumping unit |
| 16 | Turbine/generator/pump |
| 17 | Top part of undissolved salt |
| 18 | Bottom part of water volume |
| 19 | Vent |
| 20 | Heat exchanger |
| 21 | Closed loop tubing |
| 22 | Pool of water or brine |
| 23 | Turbine |
| 24 | |
| 25 | Heated water |
| 26 | U tube |
| 27 | Water reservoir |
| 28 | Branch |
| 29 | Branch |
| 30 | Reservoir surface |
| 31 | Tube opening |
| 32 | Turbine |
| 33 | Point |
| 34 | Point |
| 35 | Branch of a U tube |
| 36 | Branch of a U tube |
| 37 | Connection tube of a U tube |
| 38 | Reservoir |
| 39 | Turbine |
| 40 | Recipient |
| 41 | Gas provision unit |
| 42 | Shaft |
| 43 | Ambient air |
| 44 | Structure |

Description of Preferred Embodiments of the Invention

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following description of a preferred embodiment of the invention is exemplary without limiting the invention or the application.

Below are delineated a set of steps according to the present invention for exploiting the great potential of UPHS using in-situ salt leached caverns, and optionally for combining this with geothermal energy extraction:

Step 1): Creation of underground cavern by solution mining of underground salt deposits (salt domes, salt pillows).

Step 2): Consolidation of cavern.

Step 3): Installation of turbine, generator, etc. for UPHS operation.

Step 4): UPHS operations: Generation of energy by running water from the surface through the turbine and collecting the water at the bottom of the cavern. Storage of energy by pumping out water from the cavern to the surface.

A detailed description shall now be given with reference to FIG. 1a which shows an example involving a structure of relevance in the present context, namely a salt dome. This is a subsurface geological structure in the general form of a vertical pillar (1) of salt (typically dominated by NaCl), extending from a depth of several kilometers and to the surface (9), where it may be exposed or covered by a layer of cap rock (2) up to some hundreds of meters thick. The pillar diameter may range up to 1 km. or more. The salt dome is enveloped by surrounding rock strata (3), e.g. limestone, sandstone and dolomite.

Step 1) starts with preparatory work that includes a geological survey to ascertain suitability of a given site (e.g.: seismic tests and exploratory drilling). In cases where the salt dome is not exposed to the surface, there follows excavation, drilling and blasting from surface ground level to access the top of the salt deposit or salt dome. Tubing for transport of water and dissolved salts is then inserted into the body of salt to be removed. The simplified drawing in FIG. 1b shows one inlet tube (4) providing the water for the dissolution process, and an evacuation tube (5) for transporting the dissolved salt away from the pool of brine (6) collected at the bottom of the incipient cavity (7). The evacuated brine is either disposed of, stored or refined for sale. Water of zero or low salinity (seawater may be used) is sprayed and circulated in a controlled pattern inside the cavity to dissolve the salt and extend the cavity volume outwards and downwards to achieve the shape and size desired for the subsequent operations inside the cavity. For the present purposes, a preferred solution is as shown in FIG. 1c, where the salt has been removed from the upper part of the salt dome, leaving a cavern (8) with exposed rock walls which may be left as they are or may be sealed against water transmission. Removal of the brine may be achieved by direct pumping as implied in FIG. 1c (pump not shown), or alternatively by means of an unbroken hydraulic loop which reduces the need for pumping energy, cf. FIG. 1d: Here, the entire cavern (8) and the inlet and evacuation tubes (4), (5) form a closed hydraulic system with a water pressure head corresponding to a level above the surface (9). Water inserted into the tube (4) exerts pressure which is transmitted throughout the hydraulic system, forcing water and brine to evacuate through the tube (5). Since the brine is heavier than pure water, a pump shall be required to assist in the lifting process, but the pumping energy shall typically be small. This basic principle has been widely used in solution mining, and may be combined with elevated temperature thermal encapsulation of the tube (5) to avoid clogging due to aggregation or crystallization of the materials carried in the brine.

Step 2). Consolidation of cavern: The size and shape of the cavern shall in part be dictated by the geology and in part by how the mining of the salt is carried out. Structural considerations must be made to ensure against collapse, and for the present purposes it shall generally be advantageous to avoid further dissolution of salt during operations, cf. FIG. 1c. This may be achieved by removing all salt in at least one part of the salt deposit, leaving the surrounding rock to define the cavern walls. Alternatively, a cavern may be excavated within a limited part of a salt deposit, and an impermeable membrane may be applied on the walls against the salt. In the case of salt dome excavations, the available depth of the salt pillar shall typically exceed the optimal depth of the cavern, in which case the floor of the cavern may be covered by a membrane (10) to avoid leaching from the salt underneath.

Step 3): Installation of turbine, generator, etc., cf. FIGS. 2a,b,c: Three configurations are shown: In FIG. 2a a penstock (11) carries water from a reservoir (12) at a high level to a turbine/generator combination (13) at a low level, with water collecting in a volume (14) below. During the charge/discharge of the UPHS system, the water level in the water volume (14) shall rise and fall, and the turbine/generator is positioned as low as possible without being submerged during any part of the charge/discharge cycle, in order to maximize the amount of energy extracted. A pumping unit (15) evacuates water from the bottom of the water volume (14) during the charging cycle. In order to prevent unwanted pressure effects in the cavity (8), a vent (19) to the atmosphere is provided. In FIG. 2b the turbine/generator/pump (16) are submerged in the water volume (14). During the discharge (energy production) part of the UPHS cycle, the turbine works against a rising head in the water volume (14), which in this configuration can fill the whole cavity (8) to provide increased energy storage. With the turbine submerged throughout the charge/discharge cycles, the turbine may be run in reverse to act as a pump during the charging cycle. The configuration shown in FIG. 2c is similar to that shown in FIG. 2b, but in this case the bottom of the cavity (8) is not sealed by an impermeable membrane. Rather, it is defined by the top part (17) of the undissolved salt below. The bottom part (18) of the water volume (14) is now rich in dissolved salt, which may to a certain extent be admixed into the water passing through the turbine and pump (16). However, the concentrated layers of brine shall be heavy and may be kept near the bottom by proper design and operation of the system. The salt that is ultimately removed may have a beneficial effect by enlarging the cavity volume (8).

In parallel with the opportunities for storage of unprecedented amounts of electrical energy as described above, excavation of deep salt deposits opens up possibilities for tapping into vast geothermal resources, i.e. by transferring heat from the cavity environment to a thermal carrier fluid (e.g. water or brine) circulating in the cavity. This step may occur when significant depths have been reached during the latter stages of the solution mining process in Step 1) and/or after the cavern volume has been established and the UPHS system has been installed. An early description of geothermal heat extraction from deep salt deposits was given in: C.

H. Jacoby and D. K. Paul "Salt domes as a source of geothermal energy", Society of Mining Engineers, pp.34-39, May 1974.

The excavation procedure described above was with reference to an essentially isothermal environment, which is the case in the early stages of the mining operation and at shallow depths. However, deep salt deposits can provide access to great amounts of geothermal energy: Efficient solution mining methods exist that allow reaching great depths, salt domes can exhibit high vertical thermal gradients, and thermal diffusivities of salt in the deposits that may substantially exceed those of the surrounding rock. As shall now be described, an unbroken hydraulic loop, i.e. a communicating system of cavities and tubing that preserve the hydraulic head provided from a surface reservoir, can be combined with access to geothermal heat to extract mechanical energy, even in cases where the geothermal source is low grade in terms of available temperatures. This process shall in the following be referred to as thermally driven density differential pumping, and is described with reference to FIGS. 3, 4a-c:

FIG. 3 shows an example of a closed loop system where cold water is fed from a surface reservoir (18) through a tube (19) and heat exchanger (20) located at depth in the salt dome. The heat exchanger is in this case submerged in a pool of water or brine (22) at the bottom of the cavity (8) which represents a thermal reservoir and assists in convection transport of heat from the surrounding rock and underlying salt plug (24). As shall be described in more detail below, the water in the closed loop tubing (19), (20), (21) shall be lifted to the surface via the tube (21), and mechanical energy is extracted by a turbine (23). Heated water (25) exiting from the turbine can be made available for thermal uses (space heating, desalination, etc). The thermally driven extraction of mechanical energy is illustrated in FIGS. 4a-c: In FIG. 4a a U tube (26), is filled with water up to a level defined by the free surface (30) of a water reservoir (27) via the top of the left branch (28) of the U tube. In a quiescent state, water fills the right branch (29) of the U tube to the same level as shown. In FIG. 4b, the water in the lower part of the U tube has been exposed to heating, which lowers the local water density in the bottom part of the U tube by thermal expansion. Over time and in the absence of a directed flow in the U tube, the hot water would rise symmetrically in both branches of the U tube. In FIG. 4c, an imbalance has been introduced, whereby water in the U tube flows from left to right. As shown, the left branch (28) is replenished by cold water from the reservoir, and the hot water now fills the right branch (29), with excess water spilling out of the right branch tube opening (31) at a height Δh above the reservoir surface (30) and driving a turbine (32). This process would continue as long as the system receives cold water from the reservoir to fill the left branch and thermal energy to maintain an elevated temperature in the right branch. The maximum height $h_2$ to which the right branch water level can be lifted in this manner can be estimated as follows, with reference to FIG. 4c: Assume that the average density of the cold water in the left branch (28) is $\rho_1$. At the bottom of the left branch, i.e. at a point located at (33), the local hydrostatic pressure is generated by a water column of height $h_1$ below the free surface (30) of the reservoir (27), and the hydrostatic pressure at (33) is:

$$p_1 = \rho_1 g h_1. \quad \text{Eq.1}$$

In the right branch (29) the water is warmer and thus has a lower density $\rho_2$. If the water column in the right branch has a height $h_2$ above a point located at (34) which is at the same depth as the point located at (33), the hydrostatic pressure at (34) is:

$$p_2 = \rho_2 g h_2 \quad \text{Eq.2}$$

At near-equilibrium, there is very little flow in the U tube, and one has:

$$p_1 p_2 = \rho_1 g h_1 = \rho_2 g h_2 \quad \text{Eq.3}$$

$$h_2 = h_1 \rho_1/\rho_2 \quad \text{Eq.4}$$

$$\Delta h = h_1(\rho_1/\rho_2 - 1) \quad \text{Eq.5}$$

If there is a volume flow F [m³ s⁻¹] through the U tube, the maximum mechanical power that can be extracted by a turbine (32) is:

$$P = F g h_1(\rho_1 - \rho_2). \quad \text{Eq.6}$$

Here, the density differential $(\rho_1 - \rho_2)$ shall depend on the temperature difference between the left and the right branches in the U tube, and the volume flow shall depend on several factors, including the density differential and the cross sectional area of the U tube. An important feature of thermally driven density differential pumping as described above is that it may run in parallel with UPHS operations.

FIGS. 5,6 illustrate the basic principles underlying dissolved gas density differential pumping. This is another type of density differential pumping which can operate with or without thermal input and which employs the access to a deep underground cavity provided by solution mining as described in the present invention: As shown in FIG. 5, a U tube consisting of a left (35) and a right (36) vertical branch and a horizontal connection tube (37) is filled with water which is drawn from a reservoir (38). In operation, the water flows down the left branch (35), through a turbine (39) and rises in the right branch (36) before flowing from the top of the right branch and into a recipient (40). During its transit down the left branch, the water is saturated with dissolved gas which is provided from a unit (41) and dispensed from a shaft (42) which extends vertically inside the left branch. The gas may be ambient air (43) as indicated in FIG. 5, but other gases, e.g. $CO_2$, may be used for special purposes. Depending on the pressure and temperature, a certain amount of gas can be dissolved in the water, as described by Henry's law, which indicates that dissolved concentrations increase with increasing pressure and lower temperatures:

$$X_{gas} = P_{gas}/K \quad \text{Eq.7}$$

Here, $X_{gas}$ is the equilibrium mole fraction of solute (gas) in the liquid phase:

$$X_{gas} = (\text{No. of moles in solute})/(\text{no. of moles in solute} + \text{No. of moles in solvent}), \quad \text{Eq.8}$$

$P_{gas}$ is the partial pressure of the gas, and K is Henry's constant. K is a characteristic parameter for each type of gas, and is strongly temperature dependent. Thus, as air is brought into contact with the water in the left branch, an increasing amount of air shall be dissolved as it experiences increased hydrostatic pressure at increasing depths.

The water experiences an abrupt loss of hydrostatic pressure as it passes through the turbine (39) and thereafter rises in the right branch (36). This implies that the dissolved gas shall be brought closer to supersaturation at a given point in the right branch than at a corresponding depth in the left branch, and gas bubbles start to nucleate out of the water. To assist in this process, a structure (44) has been inserted in contact with the rising water in the right branch. The bubbles rise in the right branch through buoyancy and convection in the water flow, and expand as they encounter lower hydrostatic pressure higher up in the water column. This provides a pumping action and at the same time a density dilution effect on the water in the right branch. The net effect is a lower hydrostatic pressure at the outlet of the turbine compared to that at the inlet, and the turbine delivers power. During the process described here, the expanding bubbles perform mechanical work and the gas within would cool down if they were not in intimate thermal contact with the water. In practice, the bubble gas temperature remains close to that of the water, which experiences a moderate cooling effect during its transit through the system. Thermal effects connected with the insertion of gas and dissolution of gas in the left branch, and with nucleation in the right branch shall generally have a minor impact on the energy produced by the turbine. However, by employing cold water in the left branch, more gas can be dissolved to increase energy production. Furthermore, heating of water delivered to the right branch shall facilitate nucleation and lowering of density in the right branch, cf. FIG. 6, where the U tube is partially heated by warm water or brine (22). Thus, geothermal energy may be harvested as described above in connection with thermally driven density differential pumping to enhance energy production in the present case of dissolved gas density differential pumping.

Thus, systems as described here may generate revenues by several different modalities separately or in combination, i.e.:

Sale of pumped hydro energy storage capacity
Sale of geothermal energy
Sale of leached materials

The invention claimed is:

1. An underground hydroelectric energy production and storage system, wherein the system comprises:
    an underground cavity created by solution mining in salt deposits;
    an upper water reservoir with an upper water reservoir surface;
    tubing structure configured to lead water from the upper water reservoir into the underground cavity via an inlet tube and out of the underground cavity via an outlet tube, wherein the tubing structure comprises a closed hydraulic loop including a communicating system configured to preserve hydraulic head provided by the upper water reservoir;
    a pumping device configured to contribute to pumping water from the upper water reservoir via the tubing structure out of the cavity;
    an energy generator configured to generate energy based on water flowing through the tubing structure,
    wherein the closed hydraulic loop is arranged to allow for density differential pumping, wherein the density differential pumping is dissolved gas driven, wherein the pumping device includes a gas provision device arranged to saturate water in the inlet tube with a gas and a gas nucleation structure arranged in the outlet tube to assist in nucleating gas bubbles out of the water, and the energy generator includes a turbine arranged at a bottom part of the closed hydraulic loop.

2. The underground hydroelectric energy production and storage system according to claim 1, wherein salt is removed from at least a part of the underground cavity; and wherein the underground cavity is consolidated to avoid further dissolution of salt via at least one of:
    at least a part of the cavity being impregnated; or
    an impermeable membrane being arranged in the cavity.

3. The underground hydroelectric energy production and storage system according to claim 1, wherein the closed hydraulic loop comprises a U tube with a first branch corresponding to the inlet tube, and a second branch corresponding to the outlet tube, and the bottom part connecting the two branches.

4. The underground hydroelectric energy production and storage system according to claim 1, wherein the cavity is established with at least a lower part at a depth allowing heat transfer from the surroundings of the cavity to a thermal carrier fluid in the cavity.

5. The underground hydroelectric energy production and storage system according to claim 1, wherein the density differential pumping is further thermally driven, wherein the pumping device further comprises a heat exchanger submerged in a thermal carrier fluid in the cavity, and the closed loop is arranged for receiving water from the upper water reservoir and leading the water via the inlet tube through the heat exchanger, wherein the thermal carrier fluid in the cavity is a thermal reservoir contributing to convection transport of heat from the surroundings, and contributing to pumping the water out via the outlet tube.

6. The underground hydroelectric energy production and storage system according to claim 5, wherein the energy generator further comprises a turbine arranged above the upper water reservoir surface and configured to be driven by water flow in the outlet tube.

7. A method for producing and storing energy by operating an underground hydroelectric energy production and storage system the method comprising:
    creating an underground cavity by solution mining in salt deposits;
    providing an upper water reservoir with an upper water reservoir surface;
    providing tubing structure to lead water from the upper water reservoir into the underground cavity via an inlet tube and out of the underground cavity via an outlet tube, wherein the tubing structure comprises a closed hydraulic loop including a communicating system configured to preserve hydraulic head provided by the upper water reservoir;
    providing a pumping device to contribute to pumping water from the upper water reservoir via the tubing structure out of the cavity;
    providing an energy generator to generate energy based on water flowing through the tubing structure, and
    arranging the closed hydraulic loop to allow for density differential pumping, wherein the density differential pumping is dissolved gas driven, wherein the pumping device includes a gas provision device arranged to saturate water in the inlet tube with a gas and a gas nucleation structure arranged in the outlet tube to assist in nucleating gas bubbles out of the water, and the energy generator includes a turbine arranged at a bottom part of the closed hydraulic loop.

8. The method for producing and storing energy according to claim 7, wherein the density differential pumping is further thermally driven, wherein the pumping device further comprises a heat exchanger submerged in a thermal carrier fluid in the cavity, and the closed loop is arranged for receiving water from the upper water reservoir and leading the water via the inlet tube through the heat exchanger, wherein the thermal carrier fluid in the cavity is a thermal reservoir contributing to convection transport of heat from the surroundings, and contributing to pumping the water out via the outlet tube.

* * * * *